(12) United States Patent
Homan et al.

(10) Patent No.: US 7,733,093 B2
(45) Date of Patent: Jun. 8, 2010

(54) METHOD OF AND APPARATUS FOR MEASURING TENSOR RESISTIVITY

(75) Inventors: Dean M. Homan, Sugar Land, TX (US); Joshua W. Gibson, Missouri City, TX (US); Jonatan Jalfin, Surrey (GB); Hanming Wang, Katy, TX (US); Christophe Dupuis, Sugar Land, TX (US); Gerald N. Minerbo, Missouri City, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 361 days.

(21) Appl. No.: 11/964,157

(22) Filed: Dec. 26, 2007

(65) Prior Publication Data

US 2009/0167309 A1 Jul. 2, 2009

(51) Int. Cl.
*G01V 3/18* (2006.01)
(52) U.S. Cl. .................. 324/339; 324/343; 324/355; 324/357; 702/7
(58) Field of Classification Search ............ 324/339, 324/343, 345–347, 354–355, 357, 359; 702/7, 702/11–13
See application file for complete search history.

(56) References Cited

U.S. PATENT DOCUMENTS

| 5,984,023 | A | 11/1999 | Sharma et al. |
| 6,003,620 | A | 12/1999 | Sharma et al. |
| 6,220,371 | B1 | 4/2001 | Sharma et al. |
| 6,584,408 | B2 | 6/2003 | Omeragic |
| 2003/0146752 | A1* | 8/2003 | Gianzero et al. ............ 324/343 |
| 2007/0137894 | A1 | 6/2007 | Fujisawa |

OTHER PUBLICATIONS

Waxman, M.H. et al., Electrical Conductivities in Shaly Sands—I. The Relation Between Hydrocarbon Saturation and Resistivity Index; II. The Temperature Coefficent of Electrical Conductivity, SPE Paper 4094, 1974, pp. 213-224.

Doll, H.G. et al., Introduction to Induction Logging and Application to Logging of Wells Drilled with Oil Base Mud, Petroleum Transactions, AIME, Jun. 1949, pp. 148-162.

* cited by examiner

*Primary Examiner*—Bot L LeDynh
(74) *Attorney, Agent, or Firm*—Dave R. Hofman

(57) ABSTRACT

An induction or propagation apparatus for performing measuring the tensor resistivity of a sample of matter includes a non-conductive, generally cylindrical tubular member adapted to receive the matter therein, a triaxial transmitter, at least one triaxial receiver, and an electronic module. The electronic module is adapted to energize the triaxial transmitter, control acquisition of signals by the at least one triaxial receiver, and perform anisotropic measurements and analysis. The triaxial transmitter and the at least one triaxial receiver are disposed on the generally cylindrical tubular member in axial spaced relationship.

24 Claims, 6 Drawing Sheets

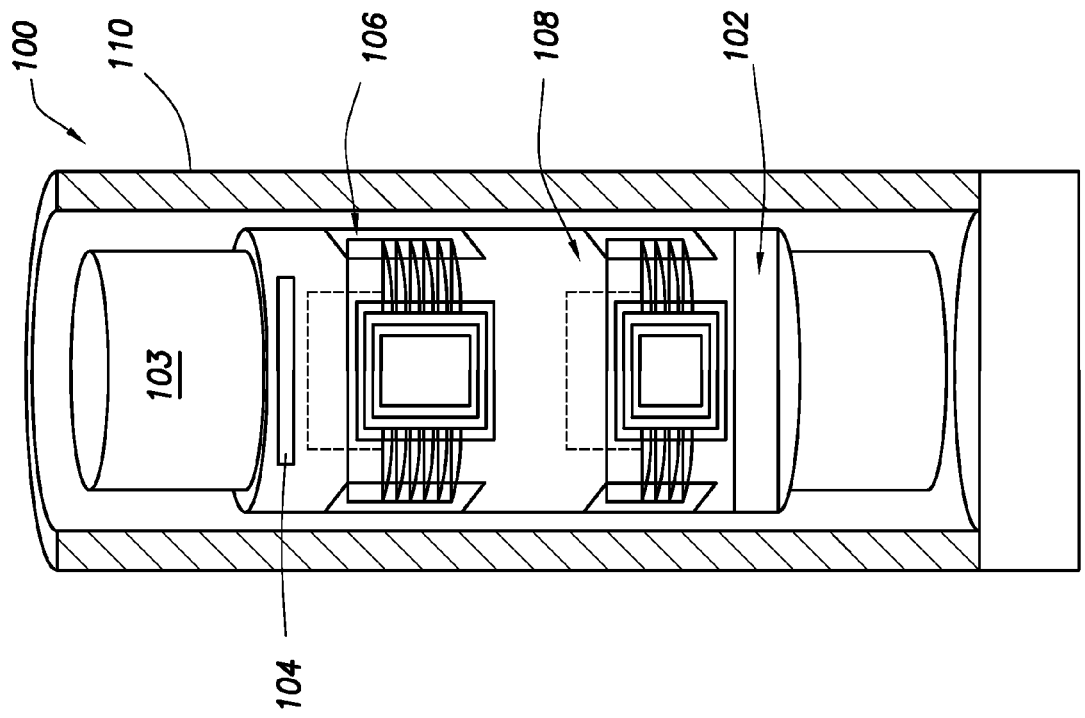
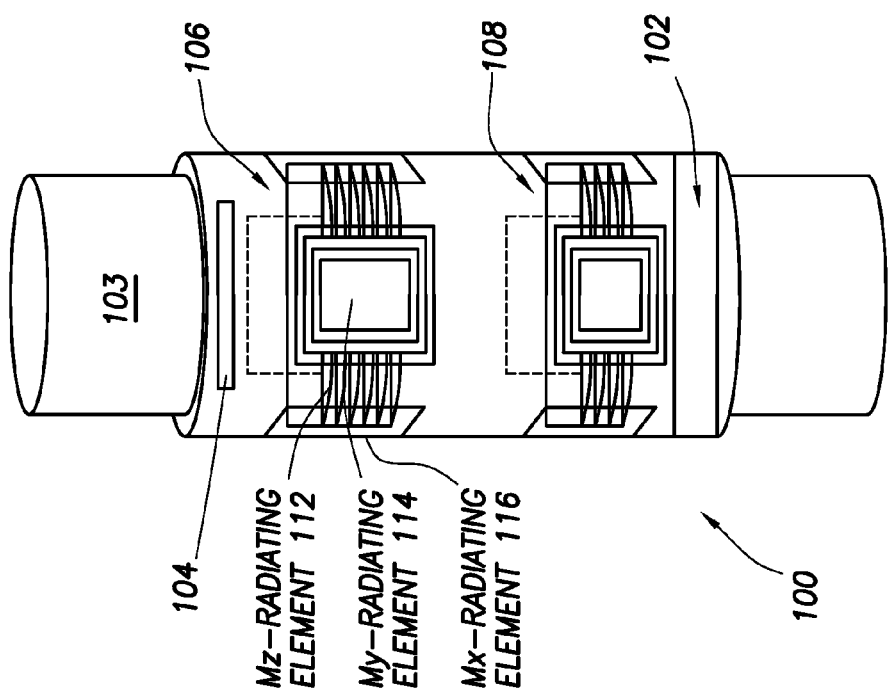

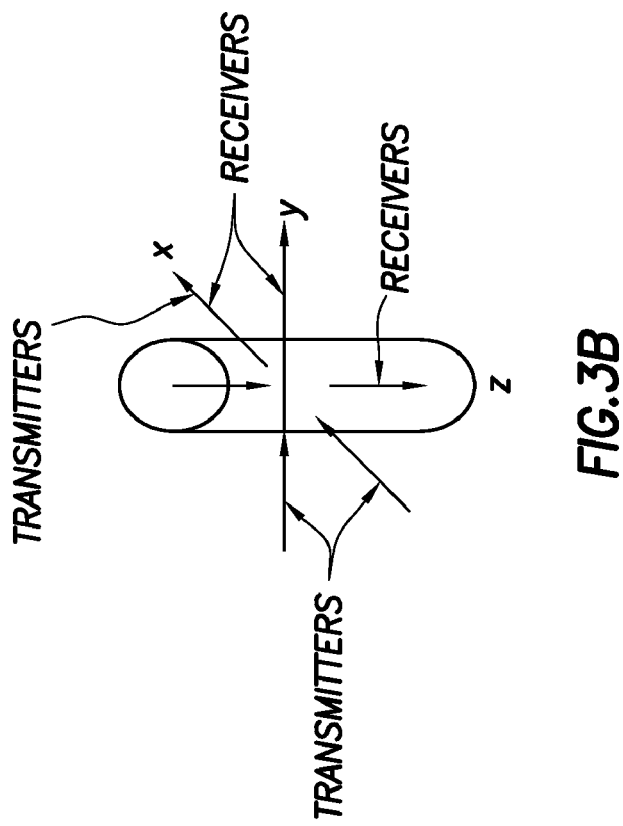
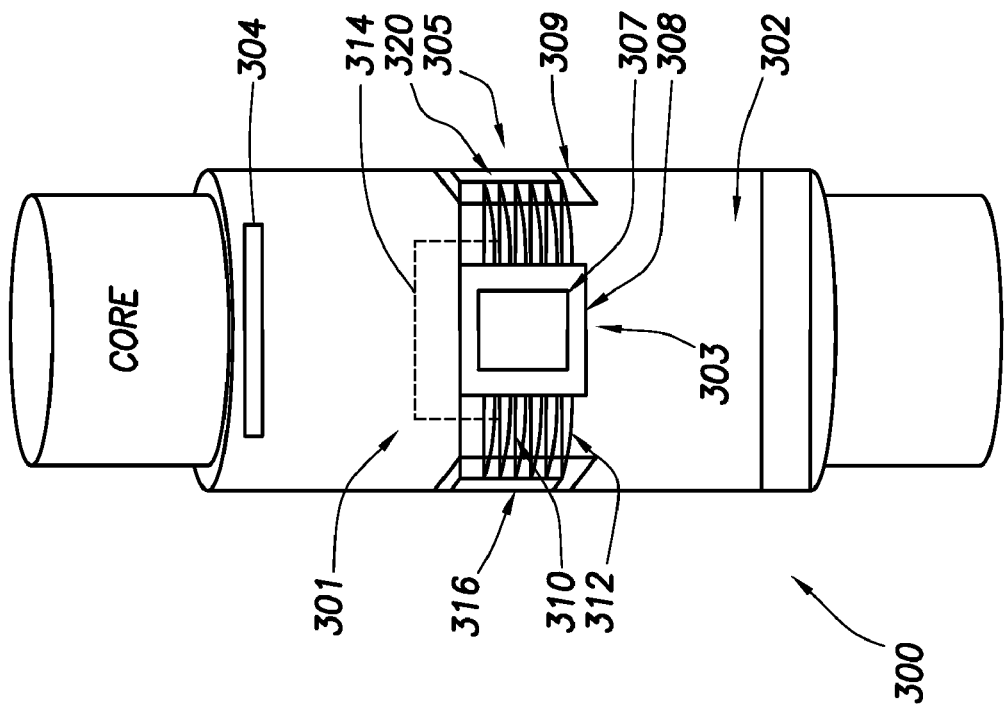

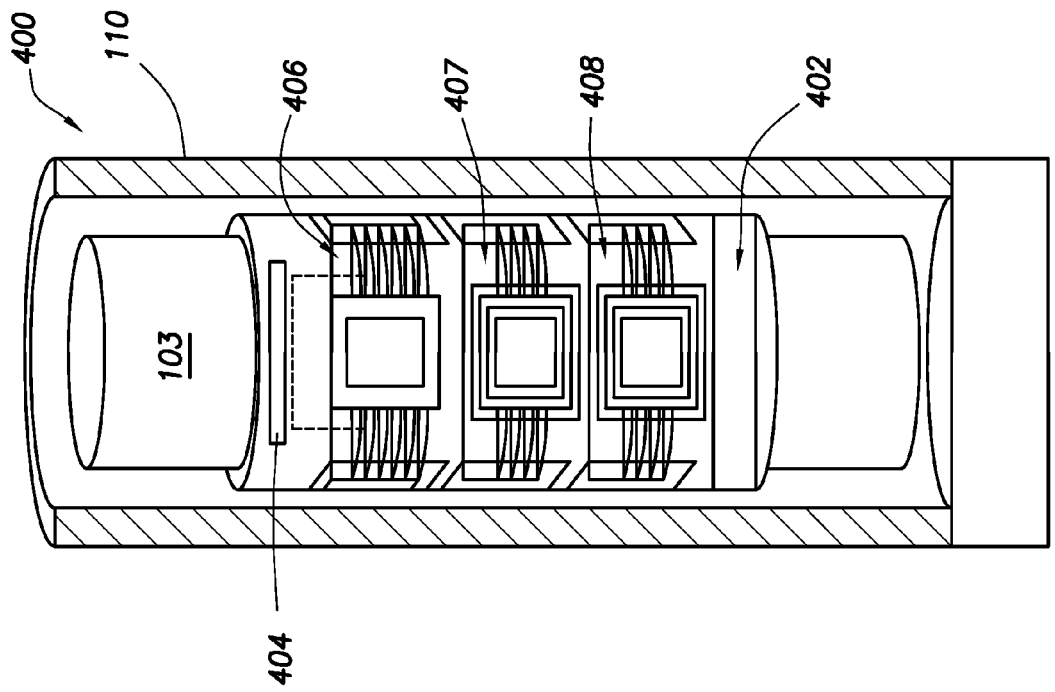
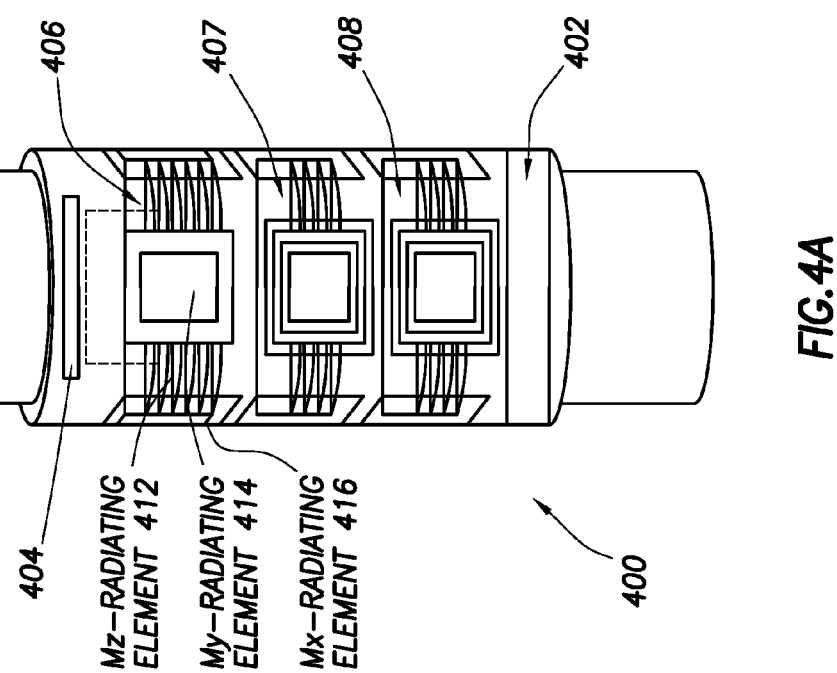
FIG.4B
FIG.4A

METHOD OF AND APPARATUS FOR MEASURING TENSOR RESISTIVITY

TECHNICAL FIELD

The present invention relates to tensor resistivity measurements including volumetric and high resolution intrinsic measurements, and, more particularly, but not by way of limitation, to analysis and anisotropic measurements of matter such as subterranean formation samples and the like, using triaxial induction or propagation resistivity measurement techniques in one or both of real time (in-situ) and post coring (uphole) modes.

BACKGROUND

In the oil and gas industry, wells are drilled deep into the earth's crust for the purpose of finding and retrieving petrochemicals. Operating companies, who own or manage such wells, as well as oilfield services companies, evaluate wells in a variety of ways, for example, by acquiring formation cores. These formation cores may be obtained using coring tools. These tools are conveyed on a drilling collar or wireline suspended into the well and are adapted to drill into a side-wall of a borehole to obtain formation samples, also known as cores.

The assessment of formation characteristics acquired from formation cores is often crucial to the decision-making process concerning development plans for petroleum wells that are being evaluated as part of an exploration or production activity. Depending on the results of the evaluation, the well could be drilled deeper, plugged and abandoned as non-productive or cased and tested. The evaluation may also be inconclusive and the determination made that additional evaluation such as, for example, further acquisition of cores of the formation, is required before a decision on the disposition of the well can be made. The results of the core analysis as interpreted from a well log may also help determine whether the well requires stimulation or special completion technologies such as, for example, gas lift or sand control. The decisions made from well evaluations are very difficult, often made with imperfect information, have huge economic impact, and frequently have to be made very quickly. Mistakes, or even mere delay, can be extremely expensive.

There are several different types of tools for obtaining side cores. One approach is to manipulate a rotating hollow cylindrical coring bit into the side-wall of the borehole. As the rotating coring bit is forced into the sidewall, a small sample of the formation, known herein as the core, is collected in the interior of the coring bit. An example of a side-coring tool is the Mechanical Side-Coring Tool (MSCT™) of Schlumberger Technology Corporation. Side-wall core samples are acquired by the MSCT™ using rotary drilling whereby no percussion damage is caused by rotary drilling into the side-wall of the borehole. The Mechanical Side Coring Tool is operable to acquire up to twenty side-wall core samples during a single trip into the borehole. The rotary drilling of the side-wall core by the MSCT™ preserves the properties of the side-wall core samples thereby allowing accurate measurements of parameters such as relative permeability and secondary porosity.

Production company personnel at a well site or other personnel involved in planning a logging job may plan for a side-wall coring job that involves acquiring side-wall cores for particular depths of interest. A coring tool is then lowered to the depth of interest and coring operations are performed at these depths. Core samples are collected in the tool and the entire apparatus retrieved to the surface. Upon retrieving the coring tool, these personnel may discover, to their dismay, that a fewer number of cores were actually acquired during the job than what was planned. An additional problem from the failure to acquire all planned side-wall cores is a difficulty in sorting out which side-wall core associates to a specific planned depth of interest. Furthermore, the lack of core analysis in current coring tools results in delay in testing and updating any reservoir model until such time the acquired side-wall cores are analyzed in the laboratory.

Electromagnetic induction and propagation logging tools are commonly used for determining electrical properties of formations surrounding a borehole. These logging tools give measurements of apparent resistivity (or conductivity) of the formation that, when properly interpreted, reasonably determine certain petrophysical properties of the formation.

Induction tools have been used for many years to measure the resistivity of earth formations surrounding a borehole. Induction logging tools measure the resistivity (or its inverse, conductivity) of the formation by inducing eddy currents in the formations in response to an AC transmitter signal. The eddy currents induce secondary magnetic fields that in turn induce voltages in receiver antennas. Because the magnitudes of the eddy currents depend on formation conductivities, the magnitudes of the received signals thus reflect the formation conductivities. A typical induction tool includes at least two induction arrays having different spacings between the transmitters and the receivers for different depths of investigation (DOI).

SUMMARY

An example of an induction or propagation apparatus for performing analysis and anisotropic measurements of matter includes a non-conductive, generally cylindrical tubular member adapted to receive the matter therein, a triaxial transmitter, at least one triaxial receiver, and an electronic module. The electronic module is adapted to energize the triaxial transmitter, control acquisition of signals by the at least one triaxial receiver, and perform anisotropic measurements and analysis. The triaxial transmitter and the at least one triaxial receiver are disposed on the generally cylindrical tubular member in axial spaced relationship.

An example of a method of measuring tensor resistivity of a mass includes the steps providing a triaxial antenna transmitter, providing at least one triaxial antenna receiver and providing a non-conductive, generally cylindrical tubular member adapted for receipt of the triaxial antenna transmitter and the at least one triaxial antenna receiver in axial spaced relationship thereon. The method further includes securing the triaxial antenna transmitter and the at least one triaxial antenna receiver in the axial spaced relationship around the generally cylindrical tubular member, disposing the generally cylindrical mass in the generally cylindrical tubular member, energizing, via an electronic module, the triaxial antenna transmitter, and obtaining, via the electronic module, data from the at least one triaxial antenna receiver indicative of tensor resistivity of the mass.

An example of a method of manufacturing an induction or propagation apparatus for performing analysis and anisotropic measurements of matter includes providing a triaxial antenna transmitter, providing at least one triaxial antenna receiver and providing a non-conductive, generally cylindrical tubular member adapted for receipt of the triaxial antenna transmitter and the at least one triaxial antenna receiver in axial spaced relationship thereon and the matter for which anisotropic measurements are to be made, therein. The method further includes disposing an electronic module on the generally cylindrical tubular member, the electronic module adapted to energize the triaxial transmitter, control acquisition of signals by the at least one triaxial receiver, and perform an analysis and electrical anisotropic measurements of the matter and securing the triaxial antenna transmitter and the at least one triaxial antenna receiver in the axial spaced relationship around the generally cylindrical tubular member.

The foregoing has outlined some of the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

The foregoing and other features and aspects of the present invention will be best understood with reference to the following detailed description of a specific embodiment of the invention, when read in conjunction with the accompanying drawings, wherein:

FIG. 1A is a conceptual illustration of an example of an induction tool of the present invention;

FIG. 1B is a conceptual illustration of another example of an induction tool of the present invention;

FIG. 3A is a conceptual illustration of an example of another induction tool of the present invention;

FIG. 3B is a vector diagram according to the example of FIG. 3A;

FIG. 4A is a conceptual illustration of another example of an induction tool of the present invention;

FIG. 4B is a conceptual illustration of another example of an induction tool of the present invention;

DETAILED DESCRIPTION

Figure 5:
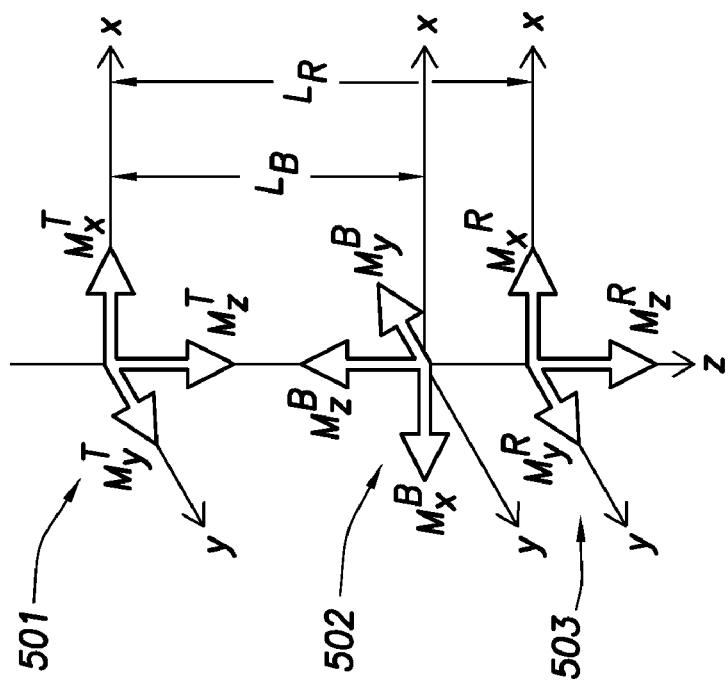
FIG. 5 is a vector diagram according to the examples of FIGS. 4A and 4B.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

As used herein, the term "axial", according to various embodiments of the present invention, refers to a direction generally parallel to a longitudinal axis of a tool, while the term "transverse", according to various embodiments of the present invention, refers to a direction generally perpendicular to the longitudinal axis of the tool. Thus, an "axial" transmitter or receiver refers to at least one radiating element having a magnetic moment parallel with the longitudinal axis of the tool. A "transverse" transmitter or receiver, according to various embodiments of the present invention, refers to at least one radiating element having a magnetic moment perpendicular to the longitudinal axis of the tool, while a "tilted" transmitter or receiver, according to various embodiments of the present invention, includes at least one radiating element having a magnetic moment that is neither perpendicular nor parallel to the longitudinal axis of the tool. The magnetic moment of a tilted transmitter or receiver can be decomposed into an axial component and a transverse component. In other words, the magnetic field generated by the tilted transmitter or receiver includes a transverse component and an axial component. Furthermore, as used herein, the term "array", according to various embodiments of the present invention, refers to a coupled transmitter and receiver. In other embodiments, the term "array" may further include a bucking receiver to reduce or eliminate mutual couplings between the transmitter and the receiver.

A logging tool for measuring electrical properties and/or resistivity tensor of an object using triaxial induction or propagation resistivity measurement, in accordance with an embodiment of the present invention includes at least one measurement that is sensitive to anisotropy of the object. Several tool configurations are capable of providing the measurements. A tool configuration may comprise a transmitter and a receiver. The transmitter and receiver form an array. The transmitter and the receiver may be, for example, triaxial antenna configurations.

A "triaxial" transmitter and receiver in this description is used in a broad sense to mean a transmitter or receiver, each comprising three antennas. According to some examples, the three antennas in a triaxial transmitter or receiver are generally arranged in a (x, y, z) coordinate system. The antennas may be, for example, coils made of a material that is ductile and is a good conductor of electricity such as, for example, copper. According to some examples, the three antennas in a triaxial transmitter or receiver are arranged in an orthogonal orientation to each other (x, y, z) thereby inducing magnetic fields in three spatial directions. The subscripts (x, y, z) indicate an orthogonal system substantially defined by the directions of the normals to the transmitters. The z-axis is chosen to be along the longitudinal axis of the tool, while the x-axis and y-axis are mutually perpendicular directions lying in the plane transverse to the axis. Arrangements using multiple transmitter and or multiple receiver antennas are also possible for triaxial induction or propagation arrays. In some examples, one of the three orthogonal antennas in the triaxial transmitter or receiver may be arranged in a direction substantially aligned with the longitudinal axis of the tool.

While some examples of this invention involve the use of triaxial transmitters and receivers, in other examples, transmitters and receivers having transverse components such as, for example, tilted or transverse transmitters or receivers may be used in place of the triaxial transmitters or receivers. According to the described examples, "transmitter" and "receiver" are used to describe different functions of an antenna, as if they were different types of antennas. This is only for illustration purposes. A transmitter radiating element and a receiver radiating element have the same physical characteristics, and one of ordinary skill in the art would appreciate that the principle of reciprocity applies and a radiating element may be used as a transmitter at one time and as a receiver at another. Thus, any specific description of transmitters and receivers in a tool should be construed to include the complementary configuration, in which the "transmitters" and the "receivers" are switched. Furthermore, in this description, a "transmitter" or a "receiver" is used in a general sense and may include a single radiating element, two radiating elements, or three radiating elements.

FIG. 1A is a conceptual illustration of an example of an induction tool 100. As shown, the induction tool 100 includes a cylindrical tube 102 on which at least one triaxial array is disposed. According to this example, the triaxial array comprises a triaxial transmitter 106 and a triaxial receiver 108. Cylindrical tube 102 is adapted to receive an object 103, comprising a mass for which the measurements are required. Cylindrical tube 102 may have a diameter of, for example, 4 inches. Cylindrical tube 102 may be made of any non-conductive material such as, for example, fiberglass. Induction tool 100 further includes an electronic module 104 disposed on an outer surface of cylindrical tube 102. Electronic module 104 includes components for controlling the signals to energize triaxial transmitter 106 and for controlling the acquisition of the signals (voltages) by triaxial receiver 108. In addition, electronic module 104 may further include a processor and/or a memory. The memory may store a program for performing data processing.

Induction tool 100 includes triaxial transmitter 106 and triaxial receiver 108 located on the outer surface of cylindrical tube 102. As note above, a "triaxial" transmitter or receiver includes a transmitter or receiver comprising three radiating elements 112, 114, 116. According to the illustrated example, three radiating elements 112, 114, 116 in a triaxial transmitter or receiver are arranged in a (x, y, z) coordinate system. Radiating elements 112, 114, 116, according to an embodiment of the present invention, are arranged in an orthogonal orientation to each other (x, y, z) thereby inducing magnetic fields in three spatial directions. Radiating elements 112, 114, 116 may be, for example, coils made of a material that is ductile and is a good conductor of electricity such as, for example, copper. The subscripts (x, y, z) indicate an orthogonal system substantially defined by the directions of the normals to the transmitters. The z-axis is chosen to be along the longitudinal axis of the tool, while the x-axis and y-axis are mutually perpendicular directions lying in the plane transverse to the z-axis. Arrangements using multiple transmitter and or multiple receiver antennas are also possible for triaxial induction or propagation arrays. In more examples, one of the three orthogonal radiating elements in the triaxial transmitter or receiver may be arranged in a direction substantially aligned with the longitudinal axis of the tool. While examples of this invention involve the use of triaxial transmitters and receivers, in some embodiments, other transmitters and receivers having transverse components such as, for example, tilted or transverse transmitters or receivers may be used in place of the triaxial transmitters or receivers.

According to some examples, logging tool 100 includes a triaxial array comprising triaxial transmitter 106 and triaxial receiver 108. The triaxial array provides measurements that can be used to derive anisotropic properties of the object, i.e., Rh, Rv, anisotropy coefficient ($\lambda$), dip, and azimuth. The distance (d) between triaxial transmitter 106 and triaxial receiver 108 may be in the range of 3 inches<d<6 inches. According to the illustrated example, triaxial transmitter 106 is disposed at a distance of, for example, 6 inches from triaxial receiver 108. The operating frequency (f) for tool 100, as illustrated in FIG. 1, is preferably in the range of DC<f<1 GHz.

Induction tool 100 shown in FIG. 1A includes one triaxial array. In operation, triaxial transmitter 106 is energized by passing an alternating current signal therethrough and the voltages received by triaxial receiver 108 are recorded. Radiating elements 112, 114, 116 in triaxial transmitter 106 may be energized at different times (time multiplexing) or at different frequencies (frequency multiplexing) so that the responses recorded by triaxial receiver 108 may be differentiated. The measurements from the triaxial array (triaxial transmitter 106 and triaxial receiver 108) therefore consist of nine possible couplings between transmitter radiating elements 112, 114, 116 and the receiver radiating elements. The voltage measurements thus obtained may be represented as a 3*3 matrix shown in equation (1):

$$V = \begin{pmatrix} V_{xx} & V_{xy} & V_{xz} \\ V_{yx} & V_{yy} & V_{yz} \\ V_{zx} & V_{zy} & V_{zz} \end{pmatrix} \qquad \text{Equation 1}$$

The voltage measurements in this matrix reflect the properties of the object as seen by induction tool 100. The matrix as shown in equation 1, relates to the electromagnetic and geometrical properties of object 103. The row of the matrix corresponds to the transmitter direction while the column corresponds to the receiver direction. According to an embodiment, if the object comprises relative dips, the voltage measurements are influenced by the relative dips and/or strikes, which may complicate data processing. In this situation, it is desirable to rotate this matrix into a more convenient coordinate system before data analysis. For example, U.S. Pat. No. 6,584,408 issued to Omeragic discloses a method that converts a complete set of couplings between the transmitters and receivers of a triaxial system between a formation coordinate system and a tool coordinate system. The conversion simplifies the data processing and allows for a direct inversion of the measurements for horizontal and vertical conductivity and dip and strike (dip-azimuthal) angles.

According to an alternate example, triaxial transmitter 106 is energized by passing an alternating current signal therethrough and the voltages received by triaxial receiver 108 are recorded. The three radiating elements 112, 114, 116 in triaxial transmitter 106 may be energized at different times (time multiplexing) or at different frequencies (frequency multiplexing) so that the responses recorded by triaxial receiver 108 may be differentiated. The measurements from the triaxial array (triaxial transmitter 106 and triaxial receiver 108) therefore consist of nine possible couplings between the transmitter radiating elements and the receiver radiating elements. The apparent conductivity tensor measurement may be represented as a 3*3 matrix shown in equation (2):

$$\sigma_{app} = \begin{pmatrix} \sigma_{xx} & \sigma_{xy} & \sigma_{xz} \\ \sigma_{yx} & \sigma_{yy} & \sigma_{yz} \\ \sigma_{zx} & \sigma_{zy} & \sigma_{zz} \end{pmatrix} \qquad \text{Equation 2}$$

The conductivity tensor measurement contains information regarding the conductivity of the matter comprising object 103 within tool 100. The conductivity tensor measurement may include, for example, volumetric and high resolution intrinsic property measurement of the matter comprising object 103 within tool 100. The conductivity tensor measurement (Equation 2) may be used to deduce, using mathematical inversion or other means, the principal conductivity tensor, and the orientations of these principal components. According to some examples, the conductivity tensor measurement may also be used to estimate, for example, a hydrocarbon content of object 103. The triaxial measurements obtained using induction tool 100 may be analyzed (by inversion) using a proper formation model to derive the electrical parameters of object 103. The modeling may use any suitable programs known in the art. Examples of such programs include those disclosed in Anderson, et al., "The Response of Induction Tools to Dipping Anisotropic Formations," Transactions of the SPWLA 36th Annual Logging Symposium, Paris, France, Jun. 26 29, 1995, paper D, Anderson et al., "The effect of crossbedding anisotropy on induction tool response," presented at the SPWLA 39th Annual Logging Symposium, May 26 29, 1998, Keystone, Colo., Paper B, and Davydycheva, et al., "An efficient finite-difference scheme for electro-magnetic logging in 3D anisotropic inhomogeneous media", Geophysics, Vol. 68, No. 5 (September October 2003), p. 15251536.

FIG. 1B is a conceptual view of another example of induction tool 100 shown in FIG. 1A. Induction tool 100, according to the example of FIG. 1B, further includes a cylindrical housing 110 around induction tool 100. The cylindrical housing may be made of any conductive, non-magnetic material such as, for example, copper, brass, aluminum, or the like. In the illustrated example, the distance (d) between triaxial transmitter 106 and triaxial receiver 108 may be in the range of 3 inches<d<6 inches. According to the illustrated embodiment, triaxial transmitter 106 is disposed at a distance of, for example, 6 inches from triaxial receiver 108. The operating frequency (f) for tool 100, as illustrated in FIG. 1B, may be in the range of DC<f<1 GHz.

Figure 2:
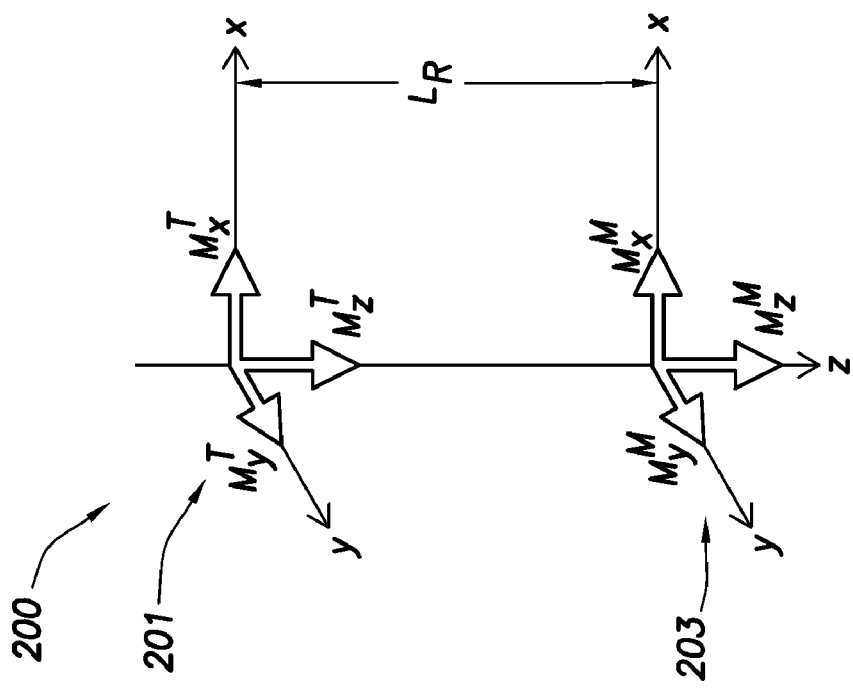
FIG. 2 is a vector diagram according to the examples of FIGS. 1A and 1B.

FIG. 2 illustrates a vector diagram 200 according to an example of the present invention. Although co-located radiating elements are shown, one of ordinary skill in the art would appreciate that embodiments of the invention do not require the triaxial radiating elements to be co-located. Co-location means that the centers of the radiating elements are substantially at the same location. Triaxial transmitter 201 includes three radiating elements having their magnetic dipoles (MxT, MyT and MzT) oriented in orthogonal directions (x, y, z). Triaxial receiver 203 includes three radiating elements having their magnetic dipoles (MxR, MyR and MzR) oriented in the same orthogonal directions (x, y, z). The subscripts (x, y, z) indicate an orthogonal system substantially defined by the directions of the normals to the transmitters. The z-axis is chosen to be along the longitudinal axis of the tool, while the x-axis and y-axis are mutually perpendicular directions lying in the plane transverse to the axis.

FIG. 3A is a conceptual view of an example of an induction tool 300 of the present invention. As shown, induction tool 300 includes a cylindrical tube 302 adapted to receive object 103 for which the measurements are desired. Cylindrical tube 302 may have a diameter of, for example, 4 inches. Cylindrical tube 302 having a diameter of, for example, 4 inches is for description purposes and may vary in other examples. Cylindrical tube 302 may be made of any non-conductive material such as, for example, fiberglass. Induction tool 300 further includes an electronic module 304 disposed on an outer surface of cylindrical tube 302. Induction tool 300 includes a triaxial transmitter 301, a triaxial receiver 303, and a triaxial bucking receiver 305. Triaxial transmitter 301 includes a plurality of radiating elements 312, 314, 316. Triaxial receiver 303 includes a plurality of receiver radiating elements 308, 309, 310, and the triaxial bucking receiver includes a plurality of bucking receiver radiating elements 307, 310, 320.

The manufacture of triaxial transmitter 301, triaxial receiver 303, and triaxial bucking receiver 305 is in accordance with established engineering principles. Radiating elements 307, 308, 309, 310, 312, 314, 316, and 320, may be, for example, coils made of a material that is ductile and is a good conductor of electricity such as, for example, copper. Electronic module 304 includes components for controlling the signals to energize triaxial transmitter 301 and for controlling the acquisition of the signals (voltages) by receivers 303 and 305. In addition, electronic module 304 may further include a processor and/or a memory. The memory may store a program for performing data processing.

Triaxial transmitter 301 comprises three radiating elements 316, 314, 312, that are arranged in a (x, y, z) coordinate system. Radiating elements 316, 314, 312, according to this example, are arranged in an orthogonal orientation relative to each other (x, y, z) thereby inducing magnetic fields in three orthogonal, spatial directions. As stated above, radiating elements 316, 314, 312 may be, for example, coils made of a material that is ductile and is a good conductor of electricity such as, for example, copper. The subscripts (x, y, z) indicate an orthogonal system substantially defined by the directions of the normals to the transmitters. The z-axis is chosen to be along the longitudinal axis of the tool, while the x-axis and y-axis are mutually perpendicular directions lying in the plane transverse to the z-axis.

In the illustrated example, triaxial transmitter 301, triaxial receiver 303, and triaxial bucking receiver 305 are located on the outer surface of cylindrical tube 302. According to some examples, radiating element 314 of triaxial transmitter 301 is oppositely disposed from receiver radiating element 308 and bucking receiver radiating element 307 at an angle of approximately 180° on the outer surface of cylindrical tube 302. Radiating element 316 of triaxial transmitter 301 is oppositely disposed from receiver radiating element 309 and bucking receiver radiating element 320 at an angle of approximately 180° on the outer surface of cylindrical tube 302. The function of bucking receiver radiating elements 307, 310, and 320 is to reduce or eliminate mutual couplings between triaxial transmitter 301 and the plurality of receiver radiating elements 308, 309, and 310.

In operation, triaxial transmitter 301 is energized by passing an alternating current signal through the three radiating elements 312, 314, 316 and the voltages received by the plurality of receiver elements 308, 309, 310 are recorded. Radiating elements 312, 314, 316 in triaxial transmitter 301 may be energized at different times (time multiplexing) or at different frequencies (frequency multiplexing) so that the responses recorded by the plurality of receiver radiating elements 308, 309, 310 may be differentiated. The measurements from triaxial transmitter 301 and the plurality of receiver radiating elements 308, 309, 310 therefore consist of nine possible couplings between transmitter radiating elements 312, 314, 316 and receiver radiating elements 308, 309, 310. The operating frequency (f) for tool 300, as illustrated in FIG. 3A, is preferably in the range of 1 KHz<f<10 MHz.

Tool 300 according to FIG. 3A is described as an induction tool. However, tool 300 may be used as a propagation tool 300. Since the difference between the two types of tool is not germane to the present description, the following description uses "induction" tools in general to refer to both "induction" and "propagation" tools.

FIG. 3B illustrates a vector diagram according to the example illustrated in FIG. 3A.

FIG. 4A is a conceptual view of another example of an induction tool. As shown, induction tool 400 includes a cylindrical tube 402 on which a triaxial array is disposed. The triaxial array comprises a triaxial transmitter 406, a triaxial bucking receiver 407, and a triaxial receiver 408. Cylindrical tube 402 is adapted to receive object 103 for which the measurements are desired. Cylindrical tube 402 may have a diameter of, for example, 4 inches. Cylindrical tube 402 may be made of any non-conductive material such as, for example, fiberglass. Induction tool 400 further includes an electronic module 404 disposed on an outer surface of cylindrical tube 402. Induction tool 400 includes a triaxial transmitter 406, a triaxial receiver 408, and a triaxial bucking receiver 407 coupled with triaxial receiver 408. As note above, a "triaxial" transmitter or receiver includes a transmitter or receiver comprising three radiating elements 412, 414, 416. Radiating elements 412, 414, 416 in a triaxial transmitter or receiver are arranged in the (x, y, z) coordinate system. Radiating elements 412, 414, 416, according to the illustrated example, are arranged in an orthogonal orientation to each other (x, y, z) thereby inducing magnetic fields in three spatial directions. While the illustrated example use triaxial transmitters and receivers, in some examples, other transmitters and receivers having transverse components such as, for example, tilted or transverse transmitters or receivers may be used in place of the triaxial transmitters or receivers.

Electronic module 404 includes components for controlling the signals to energize triaxial transmitter 406 and for controlling the acquisition of the signals (voltages) by the triaxial receiver 408. Triaxial bucking receiver 407 is located on the outer surface of cylindrical tube 402 between triaxial transmitter 406 and triaxial receiver 408. The function of triaxial bucking receiver 407 is to reduce or eliminate mutual couplings between triaxial transmitter 406 and triaxial receiver 408. For example, the triaxial bucking receiver is required when induction tool 400 is operated in a frequency range of, for example, 100 KHz<f<10 MHz.

An array, whether axial or triaxial, includes a transmitter and a receiver. An array may further include a bucking receiver. In this description, "bucking receiver" is used to refer to bucking radiating elements in general e.g., a single radiating element (axial) or three radiating elements (triaxial) bucking receiver. For an axial receiver, the bucking receiver comprises an axial radiating element wound in a direction opposite to the winding direction of the receiver radiating element. For a triaxial receiver, the bucking receiver (i.e., a triaxial bucking receiver) consists of three radiating elements wound in the same orientations as those of the corresponding receiver radiating elements, but in opposite directions.

FIG. 4B is a conceptual view of a version of induction tool 400 shown in FIG. 4A. Induction tool 400, according to the example of FIG. 4B, further comprises cylindrical housing 410 around induction tool 400. Cylindrical housing 410 is made of any conductive non-magnetic material such as, for example, copper, brass, aluminum, or the like. Distance (d) between the triaxial transmitter 406 and triaxial receiver 408 may be in the range of 3 inches<d<6 inches. According to the illustrated example, triaxial transmitter 406 is disposed at a distance of, for example, 6 inches from triaxial receiver 408. Triaxial bucking receiver 407 is located on the outer surface of cylindrical tube 402 between triaxial transmitter 406 and triaxial receiver 408. The operating frequency (f) for tool 400, as illustrated in FIG. 4B, is in the range of 100 KHz<f<10 MHz.

Tool 400 according to FIGS. 4A-4B is described as an induction tool. However, tool 400 may be used as a propagation tool 400. Since the difference between the two types of tool is not germane to the present description of the invention, the following description uses "induction" tools in general to refer to both "induction" and "propagation" tools. The operating frequency (f) for tool 400 to operate as a "propagation" tool is may be in the range of 100 KHz<f<10 MHz.

FIG. 5 illustrates a schematic of an example of a triaxial array 500 that includes a triaxial transmitter 501, a triaxial bucking receiver 502, and a triaxial receiver 503. Although co-located radiating elements are shown, one of ordinary skill in the art would appreciate that embodiments of the invention do not require the triaxial radiating elements to be co-located. Co-location means that the centers of the three radiating elements are substantially at the same location. Triaxial transmitter 501 includes three radiating elements having their magnetic dipoles (MxT, MyT and MzT) oriented in orthogonal directions (x, y, z). Triaxial receiver 503 includes three radiating elements having their magnetic dipoles (MxR, MyR and MzR) oriented in the same orthogonal directions (x, y, z). Triaxial bucking receiver 502 includes three radiating elements having their magnetic dipoles (MxB, MyB and MzB) oriented in orthogonal directions that are in opposite directions (−x, −y, z) to those of transmitter 501 and receiver 503. One of ordinary skill in the art would appreciate that bucking receiver 502 should be placed between transmitter 501 and receiver 503. As shown, bucking receiver 502 is disposed at a distance LB from transmitter 501. The distance LB is shorter than the distance (LR) between transmitter 501 and receiver 503. One skilled in the art will recognize that a triaxial array for embodiments of the invention need not be an "orthogonal" triaxial array. Furthermore, more complicated arrangements using multiple transmitter and or multiple receiver radiating elements are also possible, both for axial and for triaxial induction or propagation arrays.

With reference to FIGS. 1-5, object 103 for which the measurements (i.e., volumetric and high resolution intrinsic property measurements) are required may be any object that may exhibit anisotropy such as, for example, a geological formation, a core from a geological formation, minerals, fluids, and the like. In addition, according to some examples, the measurement of electrical properties of the object utilizing the various tools, disclosed in FIGS. 1A-5, may be performed at various locations by placing the tool at the desired location where the measurement is desired, for example by a conveyance such as, but not limited to a drilistring, wireline, slick-line, coil tubing, wired pipe, and the like. For example, the tool may be conveyed on a drilling collar or placed within a wireline logging system to obtain measurements in-situ of electrical and/or volumetric and high resolution intrinsic properties of a subterranean formation. According to another example, the tool of FIGS. 1A-5 may be utilized in a lab, wherein for example measurements of electrical and/or volumetric and high resolution intrinsic properties of a geological core sample or other object may be obtained. The tool of FIGS. 1A-5 may be used to obtain measurements of electrical properties of a fluid, at a fluid conduit for example.

Coring is a process of removing an inner portion of a material by cutting with an instrument. Coring is extensively used to determine the physical properties of subterranean geologic formations accessed via boreholes, and in particular in producing and injection wells.

Figure 6:
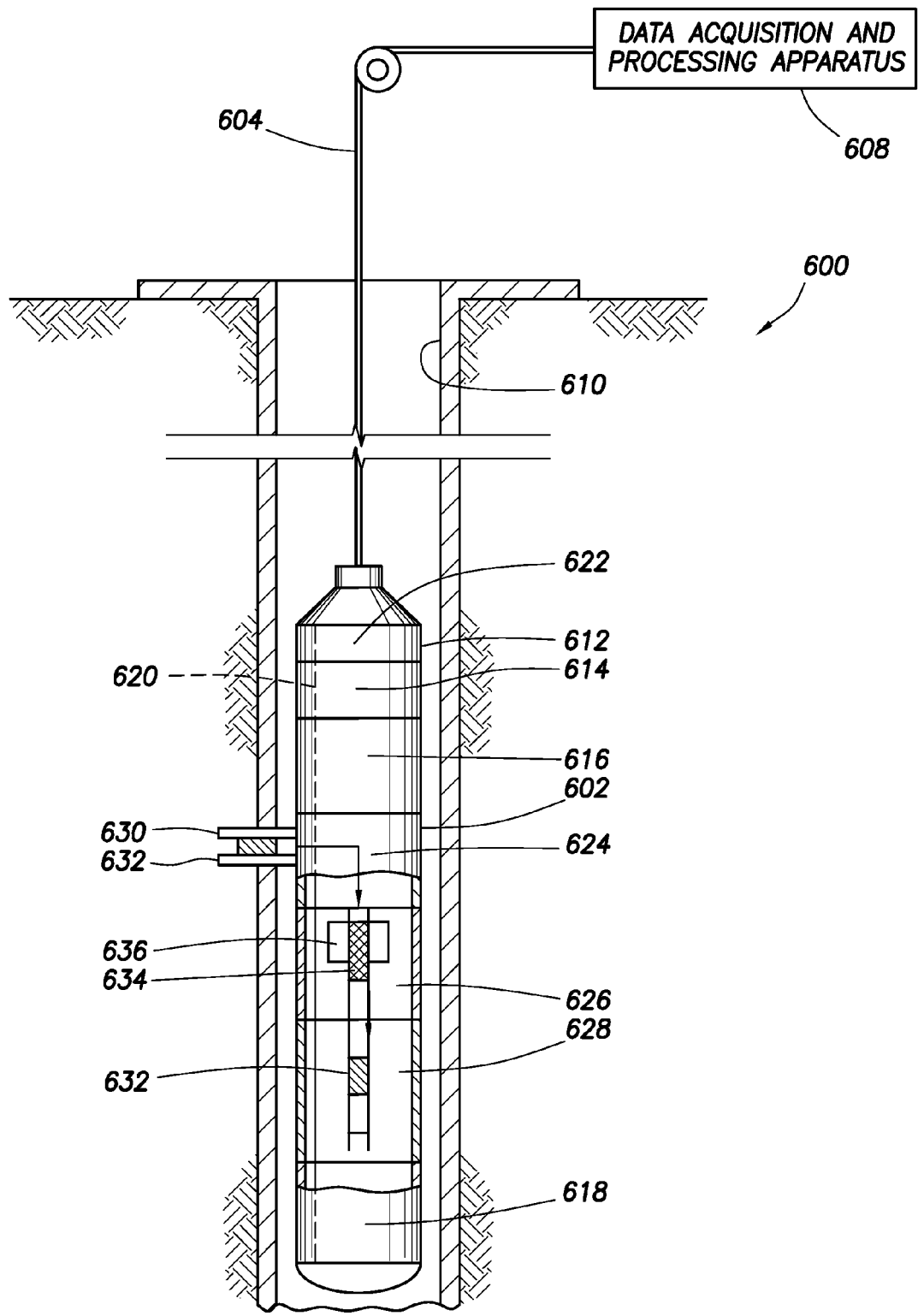
FIG. 6 is a conceptual view of an example of the induction tool utilized in a tool string disposed in borehole in combination with a coring tool.

FIG. 6 is a conceptual illustration of an example of a wellbore system 600, generally referred to herein as a logging system. For purposes of efficiency in describing various features, functions, and applications of the present invention, logging system 10 includes a coring tool 602 that includes a tool identified as measuring unit 636 herein, identified as tool 100, 300, 400 in FIGS. 1A-5. System 600 includes a bottomhole assembly or tool string, generally denoted by the numeral 612. Tool string 612 may include coring tool 602 with measurement unit 636, and additional systems such as, but not limited to, an electronics package 614, logging instruments 616 and positioning instruments 618.

Tool string 612 is conveyed into borehole 610 to obtain measurements of the geophysical properties for the subterranean formation. Tools 602, 614, 616, and 618 may be connected via a tool bus 620 to a telemetry unit 622 which may be connected to conveyance 604 for receiving and transmitting data and control signals between tool string 612 and surface data acquisition, processing and telemetry system 608.

An example of a coring tool is described in greater detail in co-pending and co-assigned U.S. patent application Ser. No. 11/304,296, entitled, "Method and Apparatus for In-Situ Side-Wall Core Sample Analysis", the entire disclosure of which is incorporated herein by reference.

In the illustrated example, coring tool 602 is a side-wall coring tool having at least one mechanical coring section 624, at least one core analysis section 626, and at least one core storage section 628. Coring tool 602 is lowered into borehole 610 to the formation of interest 630. Mechanical coring section 624 is actuated and acquires a core 632 from the surrounding earthen formation. Coring section 624 may capture core 632 in a protective canister 634 and conveys canister 634 and core 632 to the core analysis section 626. Core analysis section 626, includes at least one property measuring unit 636, shown diagrammatically as a cylindrical unit surrounding core 632 during measurement. Property measuring unit 636 may be connected to telemetry unit 622 for transmission of data to the data acquisition and processing apparatus 608 at the surface.

As noted above, property measuring unit 636 is a tool of the present invention, identified in the examples of FIGS. 1A-5 as induction tool 100, 300, 400. Unit 636 is adapted to determine electrical properties core 632, when core 632 is placed unit 636. After analysis of core 632 is completed, core analysis section 626 may be convey core 632 to a storage section 628 of side-coring tool 602 for retrieval at the surface. The illustrated example of a tool of the presenting invention is described with reference to a side-wall coring tool but may also be utilized with an in-line coring tool.

Figure 7:
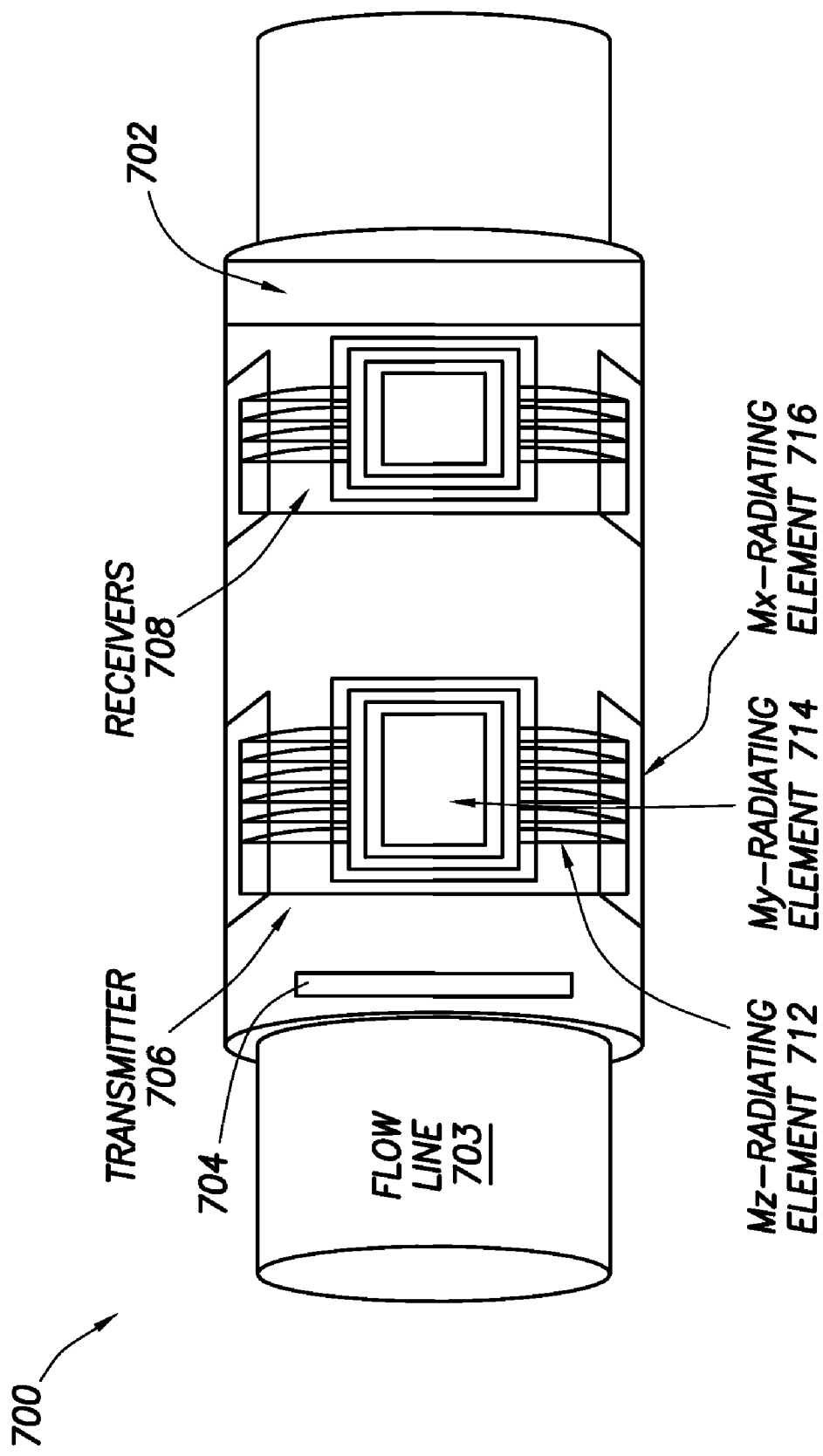
FIG. 7 is a conceptual view of an example of an induction tool utilized for measuring electrical properties of fluids.

FIG. 7 is a conceptual illustration of an example of an induction tool 700 utilized in a flow line installation. Tool 700 may be utilized to obtain measurements of electrical properties of fluid flow lines. As shown, induction tool 700 includes a cylindrical tube 702 on which a triaxial array is disposed. Array comprises a triaxial transmitter 706 and a triaxial receiver 708. Cylindrical tube 702 is adapted to receive a fluid flow line 703, the contents of which measurements are required or desired. Induction tool 700 may further include an electronic module 704 disposed on an outer surface of cylindrical tube 702. Electronic module 704 includes components for controlling the signals to energize triaxial transmitter 706 and for controlling the acquisition of the signals (voltages) by triaxial receiver 708.

As noted above, a "triaxial" transmitter or receiver includes a transmitter or receiver comprising three radiating elements 712, 714, 716. Radiating elements 712, 714, 716 in a triaxial transmitter or receiver are arranged in the (x, y, z) coordinate system. Radiating elements 712, 714, 716, according to some examples, are arranged in an orthogonal orientation to each other (x, y, z) thereby inducing magnetic fields in three spatial directions. Radiating elements 712, 714, 716, according to the illustrated example, are arranged in an orthogonal orientation to each other (x, y, z) thereby inducing magnetic fields in three spatial directions.

Although various examples of the method and system of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. An induction or propagation apparatus of measuring the tensor resistivity of a sample of matter, the apparatus comprising:
    a non-conductive, generally cylindrical tubular member adapted to receive the matter therein;
    a triaxial transmitter;
    at least one triaxial receiver;
    an electronic module adapted to energize the triaxial transmitter, and control acquisition of signals by the at least one triaxial receiver; and
    the triaxial transmitter and the at least one triaxial receiver being disposed on the generally cylindrical tubular member in axial spaced relationship.

2. The apparatus according to claim 1, wherein the triaxial transmitter comprises three radiating elements arranged in an orthogonal orientation one to the other.

3. The apparatus of claim 2, wherein the three radiating elements are energized at different times.

4. The apparatus of claim 2, wherein the three radiating elements are energized at different frequencies.

5. The apparatus according to claim 1, wherein the at least one triaxial receiver comprises three radiating elements arranged in an orthogonal orientation one to the other.

6. The apparatus of claim 1, wherein the electronic module is disposed on the cylindrical tubular member.

7. The apparatus of claim 1, wherein the matter is a borehole core sample and the induction or propagation apparatus is placed within a downhole logging system.

8. The apparatus of claim 1, wherein the matter is a fluid and the induction or propagation apparatus is placed on a fluid flow line.

9. The apparatus of claim 1, wherein the matter includes at lease one of cores, minerals, and fluids.

10. The apparatus of claim 1, wherein the apparatus comprises one triaxial receiver.

11. The apparatus of claim 1, wherein the apparatus comprises two triaxial receivers.

12. The apparatus of claim 1, wherein the non-conductive, generally cylindrical tubular member is comprised of fiberglass.

13. The apparatus of claim 1, further comprising a generally cylindrical housing member surrounding the induction or propagation apparatus.

14. A method of measuring the tensor resistivity of a sample of matter, the method comprising:
    providing a triaxial antenna transmitter;
    providing at least one triaxial antenna receiver;
    providing a non-conductive, generally cylindrical tubular member adapted for receipt of the triaxial antenna transmitter and the at least one triaxial antenna receiver in axial spaced relationship thereon;
    disposing the matter in the generally cylindrical tubular member;
    energizing the triaxial antenna transmitter; and
    obtaining data from the at least one triaxial antenna receiver indicative of tensor resistivity of the matter.

15. The method of claim 14, wherein the disposing, the energizing, and the obtaining are all performed in a wellbore.

16. The method of claim 14, wherein the at least one triaxial antenna receiver comprises three radiating elements arranged in an orthogonal orientation one to the other.

17. The method of claim 14, wherein the matter is a borehole core sample.

18. The method of claim 14, wherein the matter includes at least one of cores and minerals.

19. The method of claim 14, wherein the matter includes fluid disposed within the generally cylindrical tubular member.

20. The method of claim 19, wherein the fluid is flowing through the generally cylindrical tubular member.

21. The method of claim 14, wherein the triaxial antenna transmitter comprises three radiating elements arranged in an orthogonal orientation one to the other.

22. The method of claim 21, further comprising energizing the three radiating elements at different times.

23. The method of claim 21, further comprising energizing the three radiating elements at different frequencies.

24. A method of manufacturing an induction or propagation apparatus for measuring the tensor resistivity of a sample of matter, the method comprising:

providing a triaxial antenna transmitter;

providing at least one triaxial antenna receiver;

providing a non-conductive, generally cylindrical tubular member adapted for receipt of the triaxial antenna transmitter and the at least one triaxial antenna receiver in axial spaced relationship thereon and the matter for which anisotropic measurements are to be made, therein;

disposing an electronic module on or near the generally cylindrical tubular member, the electronic module adapted to energize the triaxial antenna transmitter, control acquisition of signals by the at least one triaxial antenna receiver, and perform the measurements.

* * * * *